US008732375B1

(12) United States Patent
Vijayaraghavan et al.

(10) Patent No.: US 8,732,375 B1
(45) Date of Patent: May 20, 2014

(54) MULTI-PROTOCOL CONFIGURABLE TRANSCEIVER WITH INDEPENDENT CHANNEL-BASED PCS IN AN INTEGRATED CIRCUIT

(75) Inventors: Divya Vijayaraghavan, Mountain View, CA (US); Chong H. Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 877 days.

(21) Appl. No.: 12/752,641

(22) Filed: Apr. 1, 2010

(51) Int. Cl.
*G06F 13/14* (2006.01)
(52) U.S. Cl.
USPC ............................ 710/305; 710/315; 710/316
(58) Field of Classification Search
USPC ......................................... 710/305, 315–316
See application file for complete search history.

(56) References Cited

U.S. PATENT DOCUMENTS

| | | | |
|---|---|---|---|
| 6,812,870 B1 | 11/2004 | Kryzak et al. | |
| 6,888,376 B1* | 5/2005 | Venkata et al. | 326/41 |
| 6,983,342 B2* | 1/2006 | Helenic et al. | 710/305 |
| 7,064,685 B1 | 6/2006 | Xue et al. | |
| 7,403,035 B1 | 7/2008 | Shumarayev et al. | |
| 7,538,578 B2* | 5/2009 | Venkata et al. | 326/41 |
| 8,165,191 B2* | 4/2012 | Vijayaraghavan et al. | 375/222 |
| 2002/0094033 A1* | 7/2002 | Baggen et al. | 375/259 |
| 2002/0152317 A1* | 10/2002 | Wang et al. | 709/231 |
| 2003/0217215 A1* | 11/2003 | Taborek et al. | 710/305 |
| 2005/0007996 A1 | 1/2005 | Venkata et al. | |
| 2005/0058187 A1* | 3/2005 | Groen et al. | 375/219 |
| 2008/0013609 A1* | 1/2008 | Daxer et al. | 375/221 |
| 2010/0162265 A1* | 6/2010 | Heddes | 719/314 |
| 2010/0215086 A1* | 8/2010 | Vijayaraghavan et al. | 375/219 |
| 2011/0292932 A1* | 12/2011 | Nichols et al. | 370/376 |

FOREIGN PATENT DOCUMENTS

| | | |
|---|---|---|
| EP | 1248372 | 10/2002 |
| EP | 1715585 | 10/2006 |

OTHER PUBLICATIONS

U.S. Appl. No. 12/288,178, filed Oct. 17, 2008, Vijayaraghavan et al.
U.S. Appl. No. 12/632,744, filed Dec. 7, 2009, Vijayaraghavan et al.
U.S. Appl. No. 12/552,069, filed Sep. 1, 2009, Wortman et al.
International Search Report and Written Opinion for App. No. PCT/US2009/059874, dated Apr. 28, 2010, pp. 1-11.
Frazier, H. "10/100G Ethernet Aggregation at the Physical Layer," Nov. 13, 2007, pp. 1-12.
Green, L. "Lane Bonding Considerations," IEEE 802.3ba Interim Meeting . . . Portland, Jan. 23-25, 2008, pp. 1-14.
Malpass. T. et al. "PBL Model Update," IEEE 802.3 Higher Speed Study Group, Nov. 12-15, 2007, Huawei Technologies Co., Ltd, pp. 1-28.
Nicholl, G. "CTBI: A simple lane bonding mechanism for both 40GE and 100GE Interfaces," Cisco, pp. 1-19.
Gustlin, M. "MLD (CTBI) Updates—MTTFPA," Jan. 2008, pp. 1-27.
Gustlin, M. et al. "100GE/40GE skew budget,"IEEE 802.3ba TF Dallas, Nov. 2008, pp. 1-21.
Chinese Office Action and Search Report issued in Chinese Patent Application No. 200980140730.9 dated Apr. 23, 2013.

\* cited by examiner

*Primary Examiner* — Nimesh G Patel
(74) *Attorney, Agent, or Firm* — Mauriel Kapouytian Woods LLP; Michael Mauriel

(57) ABSTRACT

Structures and methods are disclosed relating to a multi-protocol transceiver including lane-based Physical Coding Sublayer ("PCS") circuitry that is configurable to adapt to one of a plurality of communication protocols. Particular embodiments of the present invention include lane based configurable data paths through PCS transmit and receive circuitry.

22 Claims, 5 Drawing Sheets

US 8,732,375 B1

MULTI-PROTOCOL CONFIGURABLE TRANSCEIVER WITH INDEPENDENT CHANNEL-BASED PCS IN AN INTEGRATED CIRCUIT

BACKGROUND

This invention relates generally to the area of system interconnect technology.

As CPU speeds approach the multi-gigahertz range, system designers increasingly focus on system interconnect as the primary bottleneck at the chip-to-chip, board-to-board, backplane and box-to-box levels. System interconnect has evolved from utilizing parallel I/O technology with source-synchronous clocking or system-synchronous clocking to multi-gigabit serial I/O with clock-data recovery ("CDR"). Channel aggregation bonds individual serial I/O lanes to create a multi-lane link, transcending the bandwidth limitations of single transceiver channels and providing the high bandwidth required by next generation serial protocols. However, various communication protocols have different functional requirements. At the same time, there is an increasing need for system designers to have flexibility in designing systems to work with one particular protocol versus another. Moreover, protocols continue to evolve, so there is a need for transceivers that can be reconfigured to meet the needs of future potential variations in high speed communication protocols. Such protocols may change during the product life of an integrated circuit ("IC"); therefore there is a need for a configurable transceiver design flexible enough to potentially accommodate such changes. Specifically, there is also a need to prove such flexibility in the context of a transceiver incorporating a lane based architecture for its Physical Coding Sublayer ("PCS") circuitry.

SUMMARY

In one aspect, an embodiment of the present invention includes a multi-protocol transceiver including lane-based Physical Coding Sublayer ("PCS") circuitry that is configurable to adapt to one of a plurality of communication protocols. More particular embodiments of the present invention include lane based configurable data paths in PCS transmit and receive circuitry.

BRIEF DESCRIPTION OF THE DRAWINGS

For purposes of illustration only, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
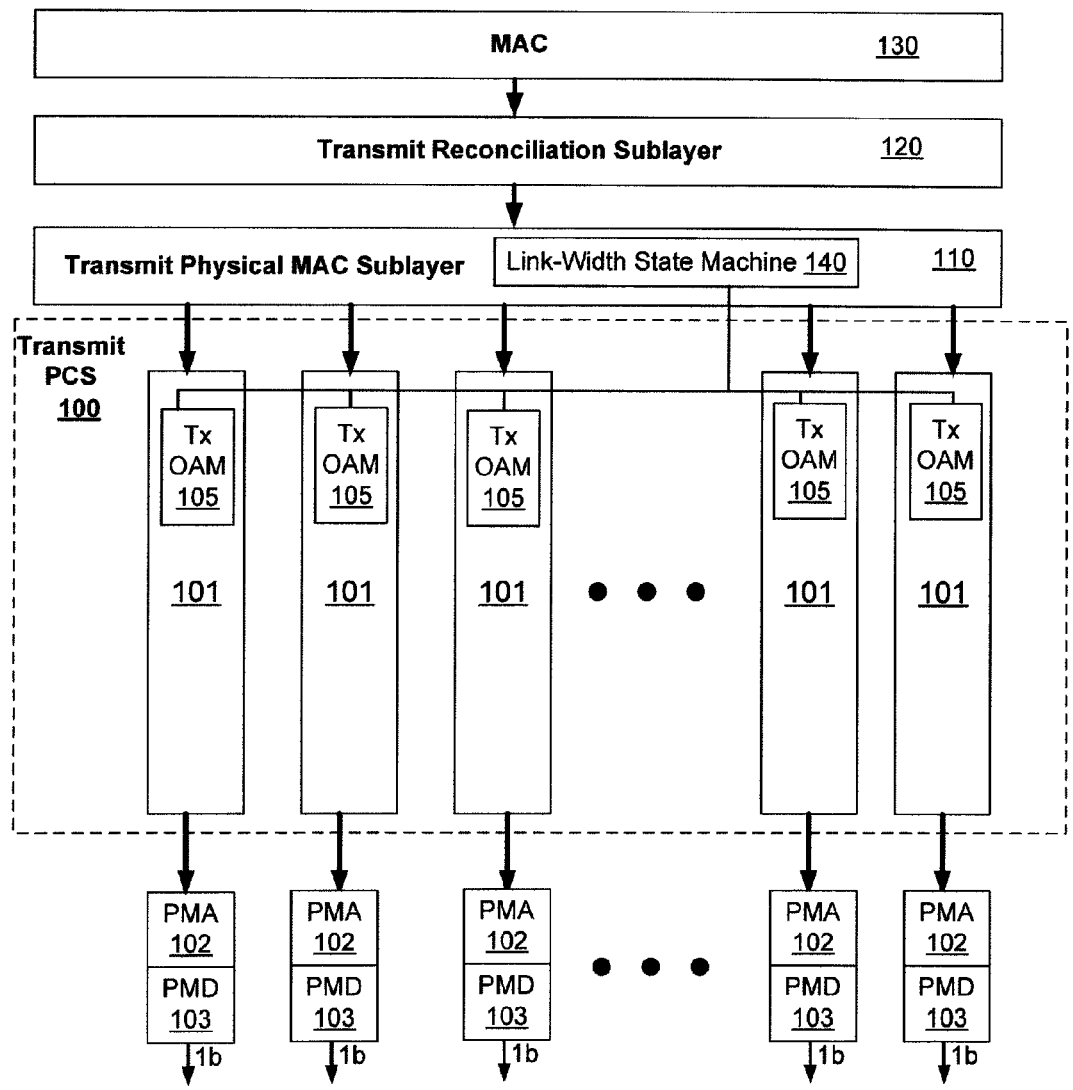
FIG. 1 illustrates transmit circuitry in accordance with an exemplary embodiment of the present invention.

FIG. 1 illustrates transmit circuitry 1000 in accordance with an exemplary embodiment of the present invention. Transmit circuitry 1000 includes Media Access Controller ("MAC") circuitry 130, transmit reconciliation sublayer circuitry 120, transmit physical MAC sublayer ("PhyMAC") circuitry 110, and transmit Physical Coding Sublayer ("PCS") circuitry 100. PCS circuitry 100 receives data to be transmitted from Physical Media Access Controller ("PhyMAC") circuitry 130. Transmit PCS circuitry 100 includes a plurality of transmit lane based data paths 101 each coupled to provide a lane of data to be transmitted to a physical medium access ("PMA") circuitry block 102 and a physical medium dependent ("PMD") circuitry block 103. Each lane-based PCS data path 101 is coupled to a local transmit operation administration and maintenance ("OAM") circuitry block 105. Each OAM circuitry block 105 provides status and control functions. Specifically, each is coupled to link-width configuration state machine 140 which, in this example, resides in transmit PhyMAC sublayer 110 and receive PhyMAC sublayer 210 (see FIG. 2). Link-width configuration state machine 140 receives status information from lane-based data paths from local transmit OAM circuitry 105 and/or local receive OAM circuitry 205 (see FIG. 2). State machine 140 is also in communication with Transmit Reconciliation Sublayer 120. Depending on link wide traffic information as determined by Transmit Reconciliation Sublayer 120, individual lane status information, and/or other inputs to state machine logic, link-width configuration state machine 140 determines when one or more transmit lanes should be shut down. When state machine 140 determines that a transmit lane should be shut down, it provides a signal to a local OAM control block 105 coupled to the relevant transmit lane data path 101. That OAM block 105 then operates to shut down the lane. Local blocks 105 also provide the ability to dynamically add lanes to a link under the control of state machine 140.

Figure 2:
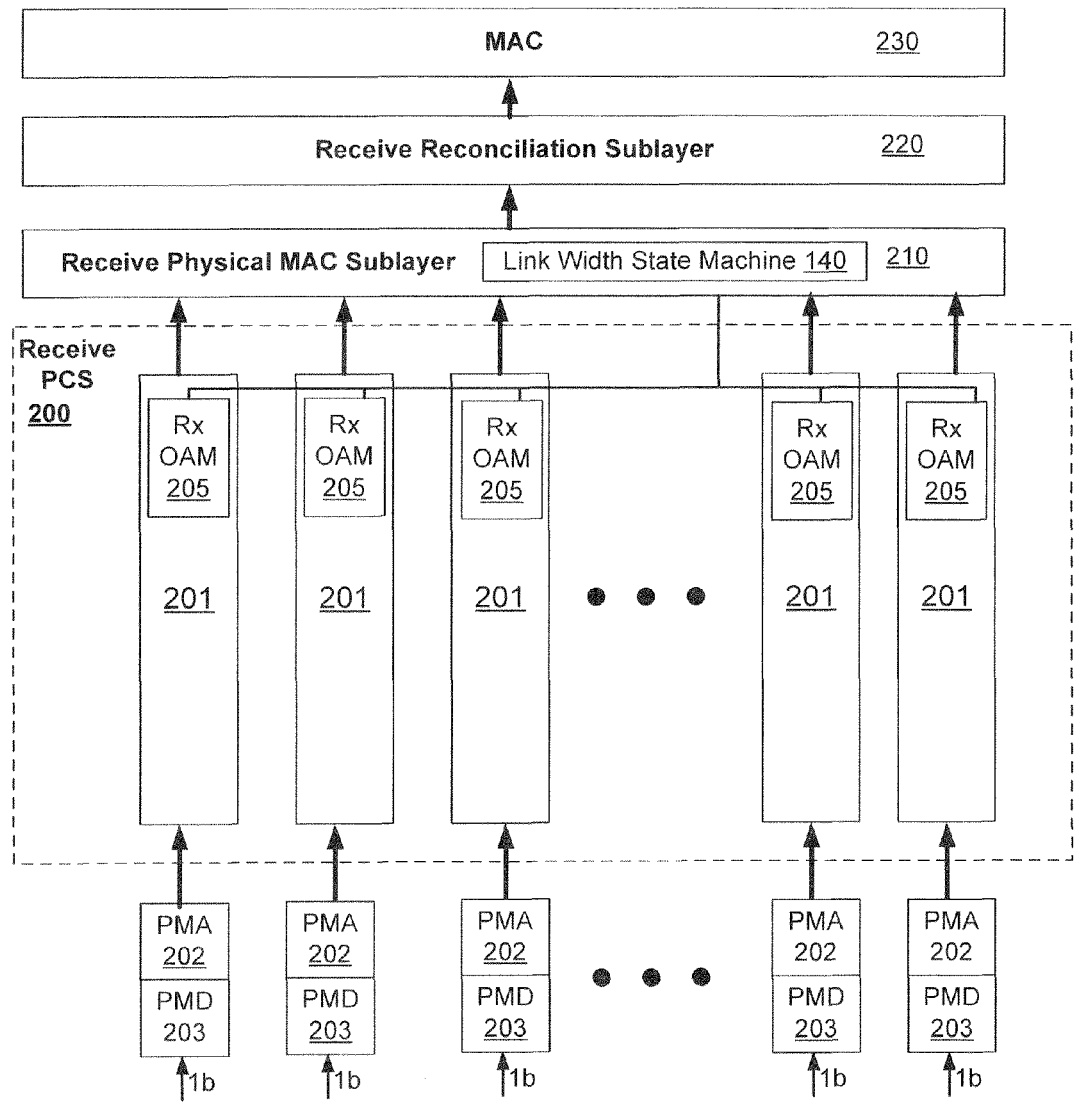
FIG. 2 illustrates receive circuitry in accordance with an exemplary embodiment of the present invention.

FIG. 2 illustrates receive circuitry 2000 in accordance with an exemplary embodiment of the present invention. Receive circuitry 2000 includes Media Access Controller ("MAC") circuitry 230, receive reconciliation sublayer circuitry 220, receive Physical MAC sublayer ("PhyMAC") circuitry 210, and receive Physical Coding Sublayer ("PCS") circuitry 200. PCS circuitry 200 receives data arriving through a plurality of PMD circuits 203 and PMA circuits 202 in a plurality of corresponding PCS lane-based receive data paths 201. Each lane-based receive PCS data path 201 is coupled to a local receive operation administration and maintenance ("OAM") circuitry block 205. Each OAM circuitry block 205 provides status and control functions. Specifically, each is coupled to link-width configuration state machine 140. Link-width configuration state machine 140 receives status information from each OAM block 205 coupled to respective receive lane-based data path 201 and determines when one or more lanes should be shut down.

Figure 3:
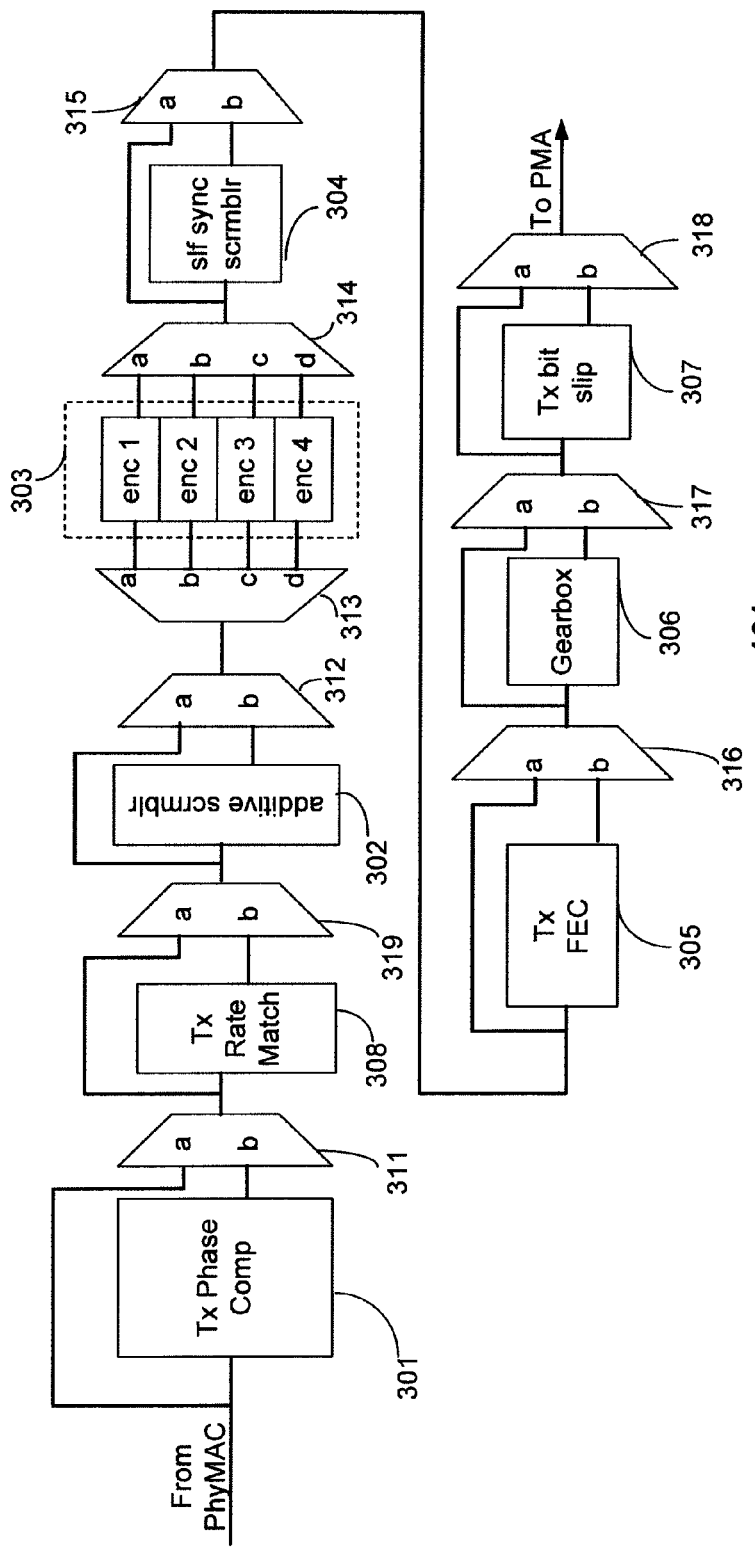
FIG. 3 illustrates further details of a lane-based transmit Physical Coding Sublayer ("PCS") data path referenced in FIG. 1.

FIG. 3 illustrates further details of a lane-based transmit PCS data path 101 referenced in FIG. 1. Transmit data path 101 includes transmit phase compensation circuitry 301, transmit rate match FIFO 308, additive scrambler circuitry block 302, encoder block 303, multiplicative (self synchronizing) scrambler block 304, transmit forward error correction ("FEC") block 305, data path width conversion ("gearbox") block 306, and transmit bit slip circuitry 307. Phase compensation circuitry 30), transmit rate match FIFO 308, and bit slip circuitry 307 are utilized when necessary for certain communication protocols to help minimize skew between transmit data lanes. Transmit rate match FIFO circuitry 308 can be used to adjust frequency by inserting or deleting data bits. Transmit bit slip circuitry 307 can be used to introduce some delay if needed to minimize transmit skew.

Transmit data path 101 further includes selection circuitry 311, 319, 312, 313, 314, 315, 316, 317, and 318. Encoder block 303 further includes encoder circuitry blocks enc 1, enc 2, enc 3, and enc 4 which, in this example, implement, respectively, the following encoding schemes: 64 bit/65 bit encoding, 64 bit/66 bit encoding, 64 bit/67 bit encoding, and 128 bit/130 bit encoding. Selection circuitry 313 and 314 are configurable to select one of these encoding blocks. Specifically, to select encoding circuitry enc1 (64 bit/65 bit encoding), selection circuit 313 (which is a de-multiplexer) would be configured to select its "a" output and selection circuit 314 (which is a multiplexer) would be configured to select its "a" input. To select encoding circuitry enc 2 (64 bit/66 bit encoding), selection circuit 313 would be configured to select its "b" output and selection circuit 314 would be configured to select its "b" input. To select encoding circuitry enc 3 (64 bit/67 bit encoding), selection circuit 313 would be configured to select its "c" output and selection circuit 314 would be configured to select its "c" input. To select encoding circuitry enc 4 (128 bit/130 bit encoding), selection circuit 313 would be configured to select its "d" output and selection circuit 314 would be configured to select its "d" input. It will be appreciated by those skilled in the art that the encoding schemes illustrated are only examples. Another embodiment in accordance with the present invention might provide more or fewer alternative encoding circuitry blocks and those blocks might implement different encoding schemes than those referenced above. The selection of schemes for which alternative encoding circuitry is provided will depend upon which communication protocols are most likely to be utilized by a user of an IC incorporating a multi-protocol transceiver consistent with an embodiment of the invention.

Selection circuits 311, 319, 312, 315, 316, 317, and 318 are configurable such that the following circuitry blocks in transmit data path 101 may be selectively bypassed (or not bypassed): Transmit phase compensation circuitry 301, transmit rate match FIFO circuitry 308, additive scrambler 302, multiplicative scrambler 304, transmit FEC circuitry 305, data path width conversion circuitry 306, and transmit bit slip circuitry 316. Which blocks are selected will depend on the particular communication protocol for which the transmit data path is configured. In one example, transmit data path 101 may be configured to operate with the 10G BASE-R protocol by configuring selection circuit 311 to select its "b" input, selection circuit 319 to select its "b" output, selection circuit 312 to select its "a" input, selection circuit 315 to select its "b" input, selection circuit 316 to select its "a" input, and selection circuits 317 and 318 to select their "b" inputs. In this manner, transmit data path 101 is configured to utilize the following circuitry blocks: phase compensation 301, transmit rate match FIFO 308, encoder 303, multiplicative scrambler 304, data path width conversion 306, and transmit bit slip 307 while bypassing additive scrambler 302 and transmit FEC 305. Transmit data path 101 could be configured to accommodate another 10 gigabit protocol, 10G BASE-KR, by nearly the same configuration but with selection circuit 316 being configured to select its "b" input instead of its "a" input, thereby utilizing rather than bypassing transmit FEC circuitry block 305. It will be understood by those skilled in the art that a protocol referred to as a "10 gigabit" protocol may not support communications at an exact speed of 10 gigabits per second, but may instead support communications at speeds somewhat greater or less than 10 gigabits per second. It will be appreciated by those skilled in the art that utilizing path 101 with an 8-12.5 gigabits per second protocol can allow a transmit portion of a transceiver, such as transmit portion 1000 of FIG. 1, to bundle a plurality of lanes to accommodate communication with higher speed protocols such as, for example, the Scalable Serdes Framer Interface ("SFI-S") protocol.

Moreover, one skilled in the art will appreciate that, in alternative embodiments, configurable bypass may be implemented with de-multiplexer circuits rather than multiplexer circuits. For example, a de-multiplexer may be used to select output from either a by-passable block or a block subsequent to the by-passable block.

As another example, transmit data path 101 may be configured to operate with a draft PCI Express Gen 3 protocol (such as defined in draft version 0.7 available from the PCI Special Interest Group) by configuring selection circuit 311 to select its "b" input, selection circuit 319 to select its "a" input, selection circuit 312 to select its "b" input, selection circuit 315 to select its "a" input, selection circuit 316 to select its "a" input, and selection circuits 317 and 318 to select their "b" inputs. In this manner, transmit data path 101 is configured to utilize the following circuitry blocks: phase compensation 301, additive scrambler 302, encoder 303, data path width conversion 306, and transmit bit slip 307 while bypassing transmit rate match FIFO circuitry 308, multiplicative scrambler 304 and transmit FEC 305.

Figure 4:
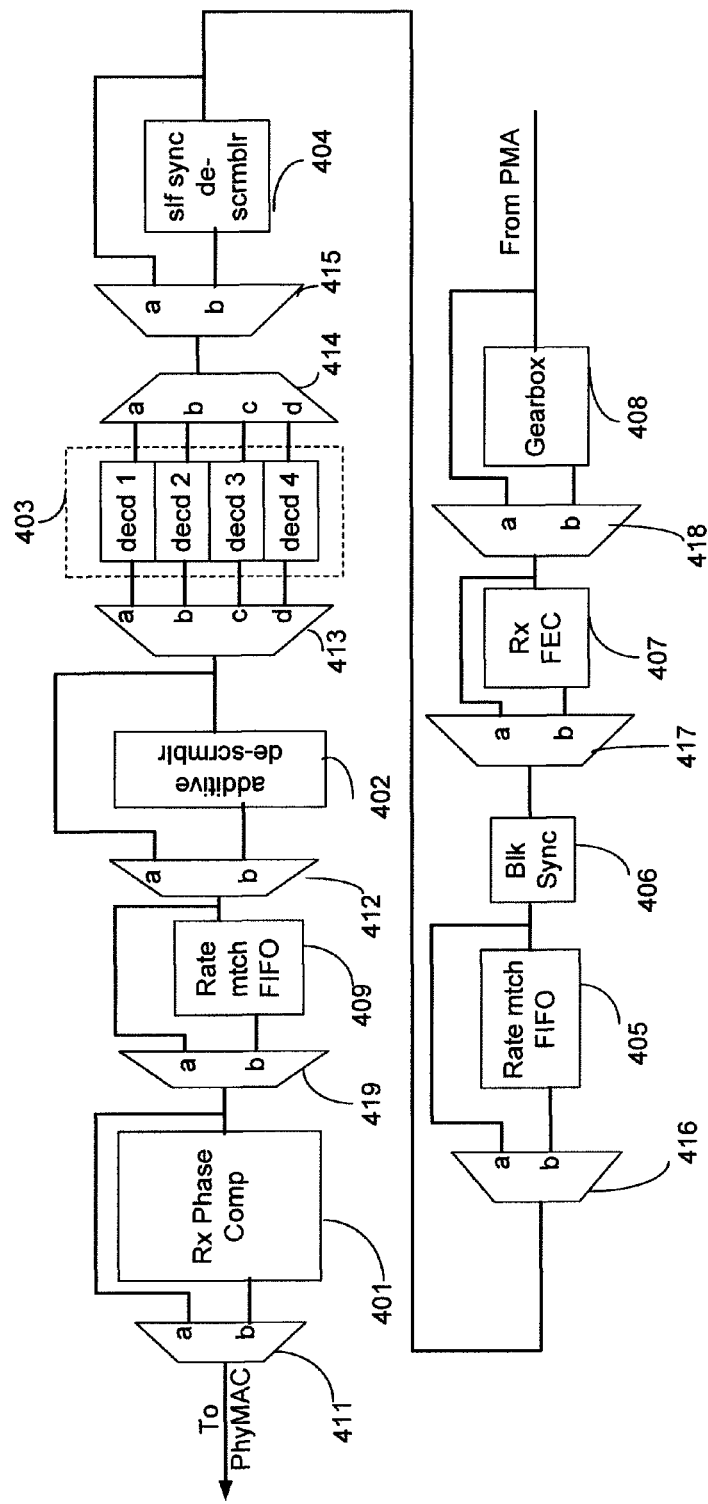
FIG. 4 illustrates further details of a lane-based receive PCS data path referenced in FIG. 2.

FIG. 4 illustrates further details of a lane-based receive PCS data path 201 referenced in FIG. 2. Receive data path 201 includes receive phase compensation circuitry block 401, receive rate match FIFO 409, additive scrambler circuitry block 402, decoder circuitry block 403, multiplicative (self synchronizing) scrambler circuitry block 404, receive rate match FIFO 405, block synchronization circuitry block 406, receive forward error correction circuitry block 407, and data path width conversion ("gearbox") circuitry block 408.

Receive data path 201 further includes selection circuitry 411, 419, 412, 413, 414, 415, 416, 417 and 418. Decoder block 403 further includes decoder circuitry blocks decd 1, decd 2, decd 3, and decd 4 which, in this example implement, respectively, decoding for the following encoding schemes: 64 bit/65 bit encoding, 64 bit/66 bit encoding, 64 bit/67 bit encoding, and 128 bit/130 hit encoding. Selection circuitry 413 and 414 are configurable to select one of these decoding blocks. Specifically, to select decoding circuitry decd 1, selection circuit 413 (which is a de-multiplexer) would be configured to select its "a" output and selection circuit 414 (which is a multiplexer) would be configured to select its "a" input. To select encoding circuitry decd 2, selection circuit 413 would be configured to select its "b" output and selection circuit 414 would be configured to select its "b" input. To select decoding circuitry decd 3, selection circuit 413 would be configured to select its "c" output and selection circuit 414 would be configured to select its "c" input. To select decoding circuitry decd 4, selection circuit 413 would be configured to select its "d" output and selection circuit 414 would be configured to select its "d" input. It will be appreciated by those skilled in the art that the encoding schemes illustrated are only examples. Another embodiment in accordance with the present invention might provide more or fewer alternative decoding circuitry blocks and those blocks might implement different decoding schemes than those illustrated. The selection of schemes for which alternative encoding circuitry is provided will depend upon which communication protocols are most likely to be utilized by a user of an IC incorporating a multi-protocol transceiver consistent with an embodiment of the invention.

Selection circuits 411, 419, 412, 415, 416, 417 and 418 are configurable such that the following circuitry blocks in receive data path 201 may be selectively bypassed (or not bypassed): Receive phase compensation circuitry 401, receive rate match FIFO circuitry 409, additive descrambler 402, multiplicative descrambler 404, receive rate match FIFO circuitry 405, receive FEC circuitry 407, and data path width conversion ("gearbox") circuitry 408. Which blocks are utilized and which are bypassed will depend on the particular communication protocol for which receive data path 201 is configured. In one example, receive data path 201 may be configured to operate with the 10G BASE-R protocol by configuring selection circuit 411 to select its "b" input, selection circuit 419 to select its "b" input, selection circuit 412 to select its "a" input, selection circuit 415 to select its "b" input, selection circuit 416 to select its "a" input, selection circuit 417 to select its "a" input, and selection circuit 418 to select its "b" input. In this manner, receive data path 201 is configured to utilize the following circuitry blocks: phase compensation 401, rate match FIFO 409, decoder 403, multiplicative descrambler 404, block sync 406, and data path width conversion 408 while bypassing additive descrambler 402, rate match FIFO 405 and receive FEC 407. Receive data path 201 could be configured to accommodate another 10 gigabit protocol, 10G BASE-KR, by nearly the same configuration but with selection circuit 417 being configured to select its "b" input instead of its "a" input, thereby utilizing rather than bypassing receive FEC circuitry block 407. It will be appreciate by those skilled in the art that utilizing path 201 with an 8-12.5 gigabit (i.e. gigabits per second) protocol can allow a receive portion of a transceiver such as receive portion 2000 of FIG. 2, to bundle a plurality of lanes to accommodate communication with higher speed protocols such as, for example, the SFI-S protocol.

As another example, receive data path 201 may be configured to operate with a PCI Express protocol Gen 3 protocol (such as defined by draft version 0.7 available from the PCI Special Interest Group) by configuring selection circuit 411 to select its "b" input, selection circuit 419 to select its "a" input, selection circuit 412 to select its "b" input, selection circuit 415 to select its "a" input, selection circuit 416 to select its "b" input, and selection circuits 417 and 418 to select their "a" inputs. In this manner, receive data path 201 is configured to utilize the following circuitry blocks: phase compensation 401, additive scrambler 402, decoder 403, receive rate match FIFO 405, and block sync 406 while bypassing receive rate match FIFO 409, multiplicative scrambler 404, receive FEC 407, and data path width conversion 408.

Those skilled in the art will appreciate that the protocols referenced herein are merely exemplary. In other examples, different circuitry blocks may be bypassed and utilized to meet the needs of a particular implementation.

Transmit circuitry 1000, shown in FIG. 1, and receive circuitry 2000, shown in FIG. 2, may be implemented as part of a transceiver in any IC that supports transceiver configuration. Such configuration may be accomplished via data stored in programmable elements on the IC. Programmable elements may include dynamic or static RAM, flip-flops, electronically erasable programmable read-only memory (EEPROM) cells, flash, fuse, anti-fuse programmable connections, or other memory elements. Transceiver configuration may also be accomplished via one or more externally generated signals received by the IC during operation of the IC. Data represented by such signals may or may not be stored on the IC during operation of the IC. Transceiver configuration may also be accomplished via mask programming during fabrication of the IC. While mask programming may have disadvantages relative to some of the field programmable options already listed, it may be useful in certain high volume applications.

A specific example of an IC that supports transceiver configuration is a programmable logic device ("PLD"), PLDs (also referred to as complex PLDs, programmable array logic, programmable logic arrays, field PLAs, erasable PLDs, electrically erasable PLDs, logic cell arrays, field programmable gate arrays, or by other names) provide the advantages of fixed ICs with the flexibility of custom ICs. PLDs have configuration elements (i.e., programmable elements) that may be programmed or reprogrammed. Placing new data into the configuration elements programs or reprograms the PLD's logic functions and associated routing pathways.

Figure 5:
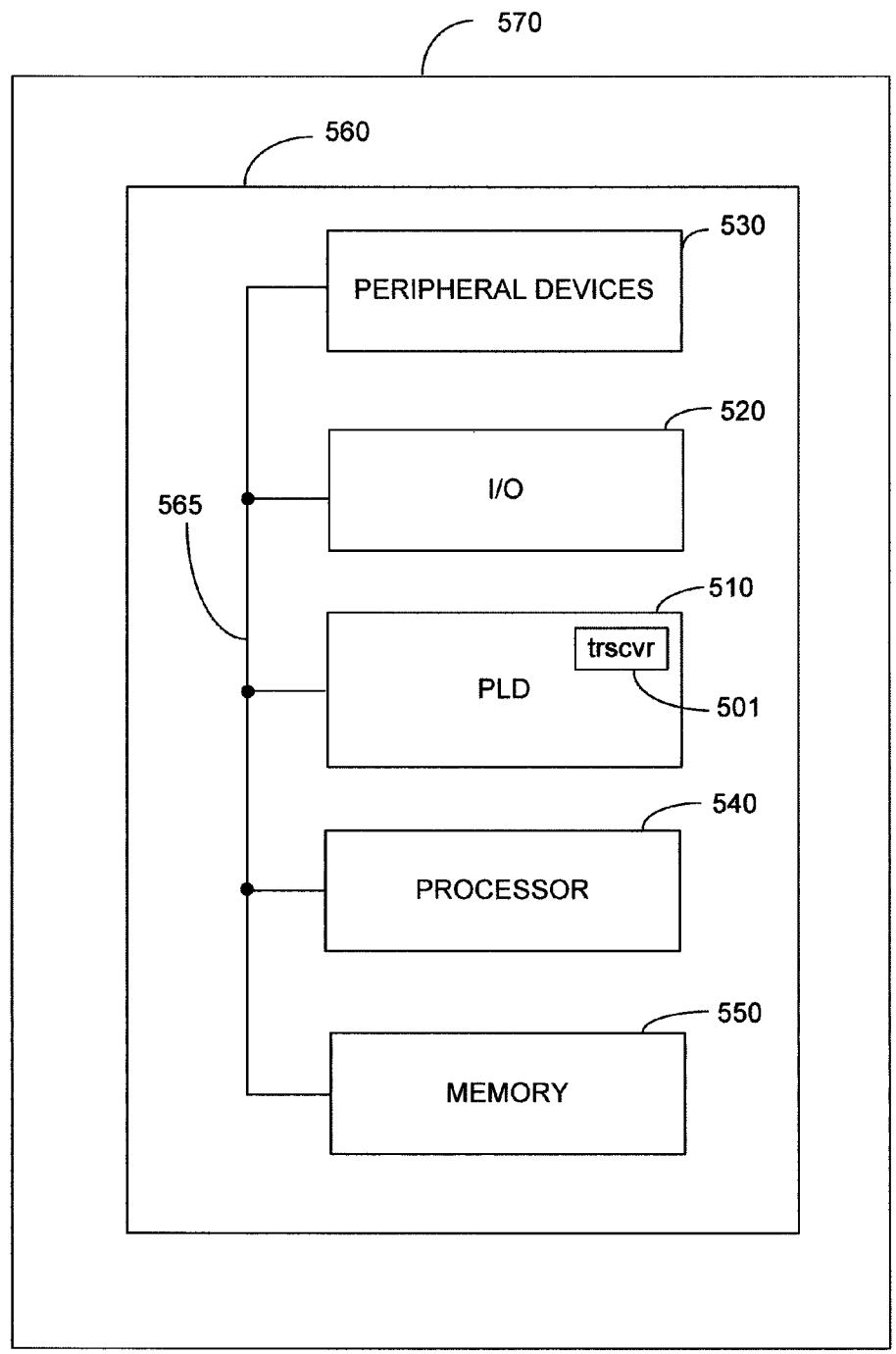
FIG. 5 illustrates an exemplary data processing system including a Programmable Logic Device ("PLD"). The PLD includes transceiver with transmit and receive circuitry in accordance with embodiments of the present invention such as those illustrated in FIG. 1 and FIG. 2.

FIG. 5 illustrates an exemplary data processing system 500 including a PLD 510, PLD 510 includes transceiver 501. For ease of illustration, only a single transceiver is shown, however, a PLD such as PLD 510 may include multiple transceivers 501. Transceiver 501 includes transmit and receive circuitry in accordance with embodiments of the present invention such as, for example, transmit circuitry 1000, shown in FIG. 1, and receive circuitry 2000, shown in FIG. 2.

Data processing system 500 may include one or more of the following additional components: processor 540, memory 550, input/output (I/O) circuitry 520, and peripheral devices 530 and/or other components. These components are coupled together by system bus 565 and are populated on circuit board 560 which is contained in end-user system 570. A data processing system such as system 500 may include a single end-user system such as end-user system 570 or may include a plurality of systems working together as a data processing system.

System 500 can be used in a wide variety of applications, such as computer networking, data networking, instrumentation, video processing, digital signal processing, or any other application where the advantage of using programmable or reprogrammable logic in system design is desirable. PLD 510 can be used to perform a variety of different logic functions. For example, PLD 510 can be configured as a processor or controller that works in cooperation with processor 540 (or, in alternative embodiments, a PLD might itself act as the sole system processor). PLD 510 may also be used as an arbiter for arbitrating access to shared resources in system 500. In yet another example, PLD 510 can be configured as an interface between processor 540 and one of the other components in system 500. It should be noted that system 500 is only exemplary.

In one embodiment, system 500 is a digital system. As used herein a digital system is not intended to be limited to a purely digital system, but also encompasses hybrid systems that include both digital and analog subsystems.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but only by the following claims.

What is claimed is:

1. A configurable transceiver including a plurality of Physical Coding Sublayer ("PCS") lane-based data paths, a lane-based data path comprising:
   a plurality of PCS lane-wide data processing circuitry blocks arranged in the data path, each circuitry block being adapted to perform a data processing step of at least one of a plurality of high speed communication protocols;
   a plurality of selection circuits coupled between at least some of the circuitry blocks, the selection circuits being configurable so that the data path either bypasses or utilizes particular ones of the plurality of circuitry blocks depending on which of the plurality of high speed data communication protocols the transceiver is to be configured to accommodate; and
   a plurality of local control circuitry blocks, each one coupled to a corresponding one of the plurality of lane-based data paths and to link-width control circuitry in the transceiver, each local control circuitry block being adapted to generate one or more of the following: (i) lane up-down information signals for the link-width control circuitry indicating up-down status of a corresponding lane-based receive data path and (ii) lane up-down control signals for controlling an up-down state of a corresponding lane-based transmit data path in response to signaling from the link-width control circuitry.

2. The configurable transceiver of claim 1 wherein the plurality of data paths include transmit data paths, a transmit data path comprising:
   a transmit phase compensation circuitry block;
   a transmit rate match circuitry block;
   an additive scrambler circuitry block;
   an encoding circuitry block;
   a multiplicative scrambler circuitry block;
   a transmit forward error correction circuitry block;
   a data path width conversion circuitry block; and
   a transmit bit slip circuitry block.

3. The configurable transceiver of claim 2 wherein selection circuits are coupled in the transmit data path such that configuration of the selection circuits can adapt the data path to either utilize or bypass any one of the following circuitry blocks in the transmit data path:
   the transmit phase compensation circuitry block;
   the transmit rate match circuitry block;
   the additive scrambler circuitry block;
   the multiplicative scrambler circuitry block;
   the transmit forward error correction circuitry block;
   the data path width conversion circuitry block; and
   the transmit bit slip circuitry block.

4. The configurable transceiver of claim 2 wherein the encoding circuitry block comprises a plurality of encoding circuitry blocks, each adapted to carry out different data encoding, the data path further comprising selection circuitry adapted to select one of the plurality of encoding circuitry blocks to be utilized in the transmit data path.

5. The configurable transceiver of claim 4 wherein the plurality of encoding circuitry blocks include at least a 64 bit/65 bit encoding block, a 64 bit/66 bit encoding block, a 64 bit/67 bit encoding block and a 128 bit/130 bit encoding block.

6. A programmable logic device ("PLD") comprising the transceiver of claim 5.

7. A data processing system comprising the PLD of claim 6.

8. The configurable transceiver of claim 1 wherein the plurality of data paths include receive data paths, a receive data path comprising:
   a data path width conversion circuitry block;
   a receive forward error correction circuitry block;
   a block synchronization circuitry block;
   a first receive rate match circuitry block;
   a multiplicative descrambler circuitry block;
   a decoding circuitry block;
   an additive descrambler circuitry block;
   a second receive rate match circuitry block; and
   a receive phase compensation circuitry block.

9. The configurable transceiver of claim 8 wherein selection circuits are coupled in the receive data path such that configuration of the selection circuits can adapt the data path to either utilize or bypass any one of the following circuitry blocks in the receive data path:
   the data path width conversion circuitry block;
   the receive forward error correction circuitry block;
   the first receive rate match circuitry block;
   the multiplicative descrambler circuitry block;
   the additive descrambler circuitry block;
   the second receive rate match circuitry block; and
   the receive phase compensation circuitry block.

10. The configurable transceiver of claim 8 wherein the decoding circuitry block comprises a plurality of decoding circuitry blocks, each adapted to carry out different data decoding, the data path further comprising selection circuitry adapted to select one of the plurality of decoding circuitry blocks to be utilized in the receive data path.

11. The configurable transceiver of claim 10 wherein the plurality of decoding circuitry blocks include at least a 64 bit/65 bit decoding block, a 64 bit/66 bit decoding block, a 64 bit/67 bit decoding block and a 128 bit/130 bit decoding block.

12. A programmable logic device ("PLD") comprising the transceiver of claim 11.

13. A data processing system comprising the PLD of claim 12.

14. The configurable transceiver of claim 1 wherein the plurality of communication protocols includes, for a PCS data lane, an 8-12.5 gigabits per second protocol.

15. A programmable logic device ("PLD") comprising the transceiver of claim 1.

16. A data processing system comprising the PLD of claim 15.

17. A method of configuring a configurable transceiver, the configurable transceiver including a plurality of Physical Coding Sublayer ("PCS") lane-based data paths, the method comprising:
   selecting a communication protocol for which the transceiver is to be configured;
   identifying first by-passable lane-wide circuitry of the transceiver that should be bypassed when using the transceiver with the selected communication protocol;
   identifying second by-passable lane-wide circuitry of the transceiver that should not be bypassed when using the transceiver with the selected communication protocol;
   configuring the transceiver such that a lane-wide data path of the transceiver bypasses the first by-passable circuitry and does not bypass the second by-passable circuitry;
   monitoring the lane-based data paths to determine if a receive lane is receiving data in accordance with the selected communication protocol;

sending signals from lane circuitry coupled to the lane-based data paths to control circuitry of the transceiver indicating whether the receive lane is receiving data in accordance with the selected communication protocol; and if the receive lane is not receiving data in accordance with the selected communication protocol, sending a control signal from the control circuitry to a transmit lane corresponding to the receive lane to stop the transmit lane from continuing to transmit data.

18. The method of claim 17 wherein configuring includes configuring selection circuitry coupled to the by-passable circuitry to select or not select data lines coupled to the by-passable circuitry.

19. The method of claim 17 wherein the communication protocol for which a PCS lane-based data path of the transceiver is to be configured is an 8-12.5 gigabits per second protocol.

20. The method of claim 17 wherein the first and second by-passable circuitry includes, in a transmit lane-based data path, an additive scrambler circuitry block, a multiplicative scrambler circuitry block, a transmit forward error correction circuitry block, a transmit data path-width conversion circuitry block, and further includes, in a receive lane-based data path, a data path width conversion circuitry block, a receive forward error correction circuitry block, a first receive rate match circuitry block, a multiplicative descrambler circuitry block, and an additive descrambler circuitry block.

21. The method of claim 20 wherein the first and second by-passable circuitry further includes, in a transmit lane-based data path, a phase compensation circuitry block, transmit rate match circuitry block, a transmit bit slip circuitry block and further includes, in a receive lane-based data path, a second receive rate match circuitry block, and a phase compensation circuitry block.

22. A method of high speed data communications using Physical Coding Sublayer ("PCS") circuitry of a transceiver comprising:

transmitting and receiving data in a plurality of PCS lanes including a plurality of respective transmit lanes and a plurality of corresponding respective receive lanes;

monitoring the receive lanes to determine if a respective receive lane is receiving data in accordance with a selected high speed communication protocol;

sending signals from lane circuitry of the PCS circuitry to control circuitry of the transceiver indicating whether the respective receive lane is receiving data in accordance with the selected high speed communication protocol; and if the receive lane is not receiving data in accordance with the selected high speed communication protocol, sending a control signal from the control circuitry of the transceiver to transmit lane circuitry of the PCS circuitry to stop a transmit lane corresponding to-the receive lane from continuing to transmit data.

* * * * *